(12) United States Patent
Dunn et al.

(10) Patent No.: US 9,191,106 B2
(45) Date of Patent: Nov. 17, 2015

(54) COMMUNICATION SYSTEM

(75) Inventors: Malcolm Harry Dunn, Fife (GB);
Donald Walker, Fife (GB); David James Mark Stothard, Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 72 days.

(21) Appl. No.: 13/392,036

(22) PCT Filed: Aug. 24, 2010

(86) PCT No.: PCT/GB2010/001604
§ 371 (c)(1),
(2), (4) Date: Feb. 29, 2012

(87) PCT Pub. No.: WO2011/027095
PCT Pub. Date: Mar. 10, 2011

(65) Prior Publication Data
US 2012/0195598 A1    Aug. 2, 2012

(30) Foreign Application Priority Data

Sep. 1, 2009   (GB) .................................. 0915163.0

(51) Int. Cl.
*H04B 10/00* (2013.01)
*H04B 10/116* (2013.01)
*H04B 10/114* (2013.01)

(52) U.S. Cl.
CPC .......... *H04B 10/116* (2013.01); *H04B 10/1141* (2013.01)

(58) Field of Classification Search
CPC ............... H04B 10/114; H04B 10/116; H04B 10/1143; H04B 10/1149; H04B 10/118; H04B 10/112; H04B 10/1121; H04B 10/1123; H04B 10/1125; H04B 10/1129
USPC ......... 398/172, 118, 119, 128, 130, 135, 136, 398/183, 127, 186, 200, 201
See application file for complete search history.

(56) References Cited

U.S. PATENT DOCUMENTS

| 5,535,033 | A | 7/1996 | Guempelein et al. |
| 5,602,668 | A * | 2/1997 | Kuchta .......................... 398/172 |
| 7,329,857 | B1 * | 2/2008 | Weiss ....................... 250/227.11 |
| 7,583,901 | B2 * | 9/2009 | Nakagawa et al. ........... 398/183 |
| 2003/0228098 | A1 | 12/2003 | Sidorovich |

(Continued)

FOREIGN PATENT DOCUMENTS

| EP | 0589711 | 3/1994 |
| EP | 1855398 | 11/2007 |

(Continued)

OTHER PUBLICATIONS

International Search Report for PCT/GB2010/001604, dated Nov. 15, 2010.

(Continued)

*Primary Examiner* — Hanh Phan
(74) *Attorney, Agent, or Firm* — Moore & Van Allen PLLC; W. Kevin Ransom (57) ABSTRACT

A communications system comprising at least one light source, a side-emitting fiber light rope into which light emitted from the light source is coupled, and means for sending at least one data carrying optical signal along the light rope.

35 Claims, 5 Drawing Sheets

(56) References Cited

U.S. PATENT DOCUMENTS

2006/0285350 A1* 12/2006 Wang .......................... 362/555
2009/0297166 A1* 12/2009 Nakagawa et al. ........... 398/172

FOREIGN PATENT DOCUMENTS

| | | |
|---|---|---|
| EP | 1860801 | 11/2007 |
| GB | 2457914 | 9/2009 |
| JP | 2004282685 | 10/2004 |
| JP | 2004320101 | 11/2004 |
| WO | WO94/02997 | 2/1994 |
| WO | WO98/35181 | 8/1998 |

OTHER PUBLICATIONS

Search Report for GB Application No. GB0915163.0, dated Dec. 4, 2009.

* cited by examiner

COMMUNICATION SYSTEM

FIELD OF THE INVENTION

The present invention relates to a communication system. In particular, the invention relates to a communication system that can also provide a continuous path of light for the purposes of illumination.

BACKGROUND OF THE INVENTION

Smart lighting systems that facilitate dual function lighting and communications are known. For example U.S. Pat. No. 6,548,967 describes a system in which LEDs, tungsten bulbs, or halogen strip lights are used for the purpose of illumination and communication. However, these require electrical connections to be established to allow drive current to be provided to the lighting element and to send control signals to discrete devices. Hence, if an extensive coverage area is required the lighting elements either have to be connected to existing wiring or a separate electrical network has to be put in place. In addition, if an extensive coverage area is required for communications then multiple access points need to be provided thereby requiring the installation of a data-comms network based on either hard wired or free-space electromagnetic-wave linkages. Further background on the present state of the art is described by A. M. Street et al in the article "Indoor optical wireless systems—a review", Optical & Quantum Electronics 29 (1997) 349-378; J. M. Kahn and J. R. Barry, "Wireless Infrared Communications", Proceedings of the IEEE 85 (1997) 265-298.

SUMMARY OF THE INVENTION

According to a first aspect of the present invention, there is provided a lighting system comprising a light source, a side-emitting fiber light rope into which light emitted from the light source is coupled, and means for sending at least one data carrying optical signal along the light rope. In some embodiments, the light-rope assumes a dual functionality in providing both illuminations and communications.

The means for sending at least one data carrying optical signal along the light rope may be operable by modulating light from the source, the modulation representing the data-carrying signal. Alternatively or additionally the means for sending at least one data-carrying signal may be operable by injecting data carrying light from another source into the rope.

When the data carrying radiation is emitted along the length of the light-emitting rope the imposed message/communication is effectively broadcast into the regions or regions surrounding the light rope throughout the length of the light rope. Through detection of the emitted light with a suitable detector the original message/communication can be recovered anywhere along the length of the rope. For example, where the light is modulated, and the modulated signal carries the data, the message communication can be retrieved by demodulation of the detected light. In this way, personnel within the vicinity of the light rope and anywhere along its length can receive a message or other form of communication provided they have a suitable detector.

The light used for communications may be invisible to the human eye, for example, the light may be IR radiation. Alternatively, the light may be visible to the human eye.

Advantageously no electrical power needs to be made available along the length of the rope since the message is carried by the light both throughout the length of the rope and following subsequent emission of such light throughout the space surrounding the rope. The rope allows the message to be effectively broadcast over considerable distances rather than being confined to the immediate vicinity of the primary light emitter.

The system of the invention can be used to broadcast messages/communications to personnel operating in hazardous environments and/or environments where communication using conventional wireless schemes is not possible due to electromagnetic screening/shadowing. Advantageously, side-emitting light rope is an ideal illuminator for hazardous environments where cold (electrically-free) distributed light is required for example to illuminate escape routes.

It will be appreciated that the present invention eliminates the need for either an extensive electrical network or an extensive data-comms network servicing numerous individual sources of light for illumination and/or communication purposes respectively.

A receiver may be provided for receiving light emitted from the light rope and a processor for processing the receiver light to determine any data carrying message or signal. The processor may be operable to decode or demodulate the received signal thereby to determine the data-carrying message.

The receiver may have at least one user interface for presenting the data-carrying message or signal to a user. The user interface may have a display. The user interface may be adapted to provide an audio output, as well as or as an alternative to a visual output.

Examples of the primary light source are a Laser, a Laser Diode and a Light Emitting Diode (LED). Preferably, as the human eye has greatest response to light of near-green frequencies, the light source may be selected to emit green light.

The fiber light rope may comprise a plurality of side emitting fiber optic cables bundled together, typically twisted together, and encased in a transparent plastic sheath.

The light coupled into the fiber may be shaped so that it substantially fills the fiber rope. The light coupled into the fiber may have a substantially uniform power distribution.

Coupling optics may be provided to couple the light into the fiber light rope. The coupling optics may perform the dual function of coupling the light into the fiber and shaping the light so that it substantially fills the fiber rope and has a substantially uniform power distribution.

The coupling optics may include beam transformer or shaping optics to suitably shape the light into a beam having a predetermined profile to promote spreading of the beam in the fiber light rope. The beam profile may be a top hat profile. The coupling optics may comprise telescope optics.

An index-matching unit, such as an index matching gel cell, may be included between the coupling optics and the fiber light rope to aid coupling of the light into the fiber light rope.

A single light source may be coupled into one end of the fiber light rope, or alternatively each end of the fiber light rope may have a light source coupled thereto. In this case, both sources would be associated with their own dedicated control units and power supplies. Both sources may be involved in coupling modulated light into the fiber light rope for the purpose of communications.

The fiber rope may comprise a single solid fiber or a multi-core fiber or a bundle of single fibers. The fiber rope may comprise a plurality of side emitting fiber optic cables. An external transparent jacket may surround the fiber rope. The each fiber may be made from one of the following materials: acrylic, PMMA, silica.

The fiber light rope may be comprised of a plurality of single fibers or bundles of single fibers that are woven or braided together in order to maintain the overall integrity of the fiber rope.

A beamsplitter may be positioned in the optical path of light emitted by the optical source to split the light into two or more beams. The two or more beams may be coupled into two or more fiber light ropes. Alternatively, the two or more beams may be coupled into opposite ends of a single fiber light rope to form a closed loop.

BRIEF DESCRIPTION OF THE DRAWINGS

Various aspects of the invention will now be described by way of example only and with reference to the embodiments shown in the accompanying drawings in which:

FIG. 4 (c) is a schematic showing the deployment of the detector of FIG. 4(b) on the fiber light rope;

FIG. 5 (a) shows the topology associated with a diffuse scheme;

FIG. 5 (b) shows a hemispherical concentrator; and

FIG. 5 (c) shows the deployment of a hemispherical concentrator in a diffuse scheme.

SPECIFIC DESCRIPTION OF THE DRAWINGS

Figure 1A:
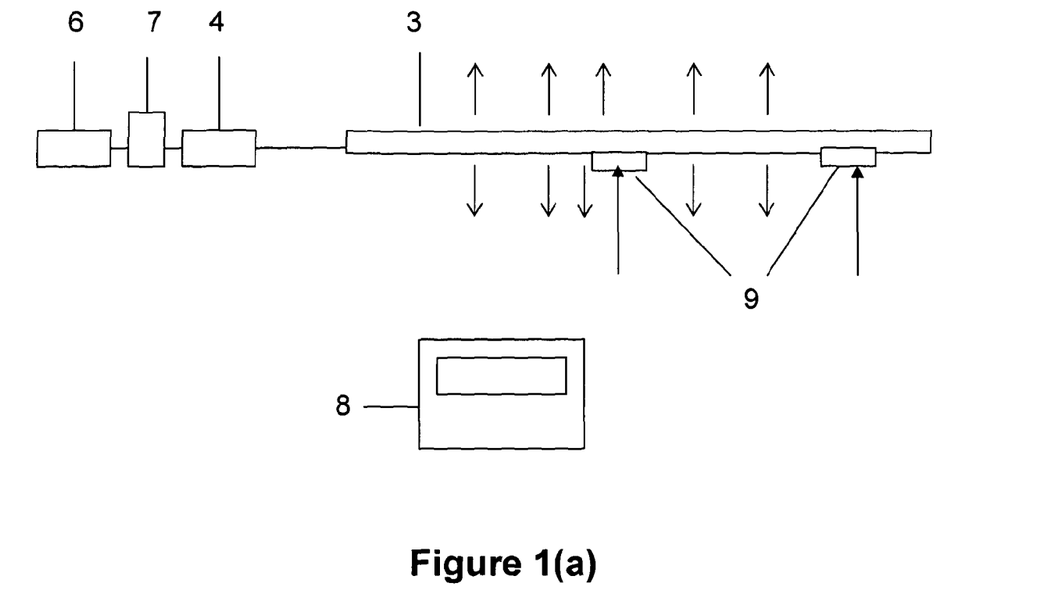
FIG. 1(a) is a schematic diagram of a first dual function lighting and communication system.

FIG. 1(a) shows an optical communications system that has a light rope 3 for sending one or more messages along the length of the rope 3. The system has a primary light source 4 that has an output that is coupled to the light rope 3. Associated with the light source 4 is a processor 6 for processing one or more data signals, which may be from a remote data centre (not shown), for transmitting along the light rope.

Connected to the processor 6 is a drive system 7 for driving the light source 4. The processor 6 controls the output of the drive 7 to cause the light source to output radiation that carries the communications data. For example, the processor 6 may be adapted to modulate the light output by the source 4, the modulation carrying the data. Signal modulation is well known in data communications and so will not be described in detail.

Optical radiation from the primary source 4 is used to excite the side-emitting light rope, thereby to provide a source of illumination along the length of the rope 3. This is modulated under the control of the processor 6 to carry a message or other form of communications. When the data carrying radiation is subsequently emitted along the length of the light-emitting rope 3 the imposed message/communication is broadcast into the regions or regions surrounding the light rope 3 throughout the length of the light rope. No electrical power is needed along the length of the rope 3 since the message is carried both throughout the length of the rope and the space surrounding the rope by the light alone. In this way, the rope 3 allows the message to be broadcast over considerable distances rather than being confined to the immediate vicinity of the primary light emitter.

In the system of FIG. 1(a), the data-carrying optical signal may be covert, i.e. invisible to the unaided human eye. Alternatively, light from the source 4 may be visible. In this case, the light may be of sufficient strength to provide both communications and illumination, so that the area in the vicinity of the rope 3 can be illuminated.

Figure 1B:
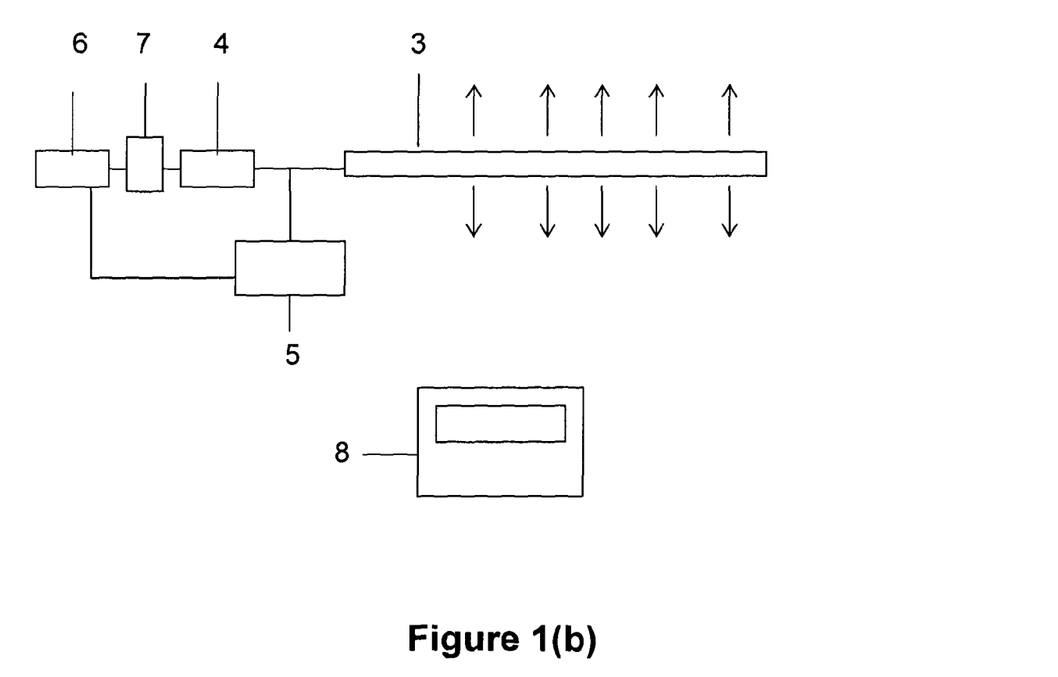
FIG. 1(b) is a schematic diagram of another dual function lighting and communication system.

FIG. 1(b) shows a dual function optical and communication system. This is similar to that of FIG. 1(a), but as well as a primary light source 4 that has an output that is coupled to the light rope 3, a secondary light source 5 is provided, which also has an output that couples into the light rope 3. The processor 6 controls the source 5 to cause it to output radiation carrying the communications data. Data-carrying light from the second source 5 is injected into the light rope 3 and carried together with the illuminating light from the primary source 4.

Optical radiation from the primary source 4 is used to excite the side-emitting light rope and provide a source of illumination along the length of the rope 3. The data-carrying signal from the secondary source is modulated under the control of the processor 6 to carry a message or other form of communications and injected into the rope. When the data carrying radiation is emitted along the length of the light-emitting rope 3 the imposed message/communication is broadcast into the region or regions surrounding the light rope 3 throughout the length of the light rope.

In the system of FIG. 1(b), where two different sources are used, either the same or different wavelengths of light may be used for lighting and communications. The light used for communications may be invisible to the human eye. For example, the light may be IR radiation. Alternatively, the light for both illumination and communications may be visible to the human eye.

To detect messages transmitted using either of the systems of FIG. 1(a) or (b), detector units 8 are provided. These have optical receivers for receiving the data carrying signals; one or more decoders or demodulators for decoding or demodulating the transmitted message and a user interface, for example a screen, for presenting the message to a user. Through detection of the light emitted from the rope 3, the original message/communication can be recovered anywhere along the length of the rope by demodulation of the detected light. Hence, personnel within the vicinity of the light rope 3 and anywhere along its length can receive a message or other form of communication provided they have a suitable detector 8. The detector 8 may be deployed either by placing it in contact with the fiber light rope or by maintaining its location within the surrounding space, the latter allowing ambulatory or otherwise mobile usage.

The light rope 3 may be a single-stranded or multiple-stranded fiber-optic fabricated from glasses or plastics, or otherwise a light pipe, in all cases suitably arranged or treated such that it leaks light into the surrounding space along its length in a controlled manner. The source may be a laser or light emitting diode or other suitable source.

Modulation may be applied to the light either through a mechanism or component integral to the source itself or through an additional effect or device following emission by the primary source or secondary source, or a combination of both. By way of examples only, modulation may be amplitude, intensity, phase, or pulse code modulation and be effective through modulation of the polarisation, spectral profile, or temporal envelope of the light.

FIG. 2 shows four arrangements employing the lighting and communications systems of FIGS. 1(a) and (b).

Figure 2A:
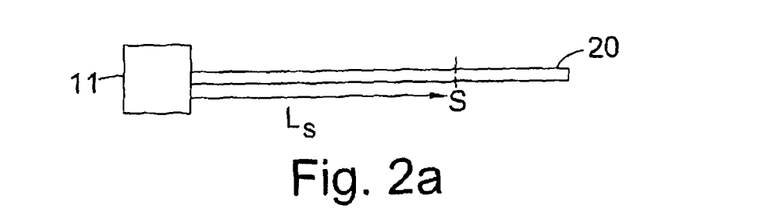
FIG. 2 shows four light rope arrangements for use in the system of FIG. 1.

FIG. 2(a) shows a system in which the fiber light rope 20 has a lighting and communication assembly 11 at one end thereof. If the fiber light rope 20 is undamaged or only partially fractured the lighting system 11 may provide lighting and communications along the entire length of the fiber light rope 20; if the fiber light rope 20 is severed the system 11 may provide lighting and communications along a length of the fiber light rope 20 $L_S$ up to a severed part S of the fiber light rope 20.

Figure 2B:
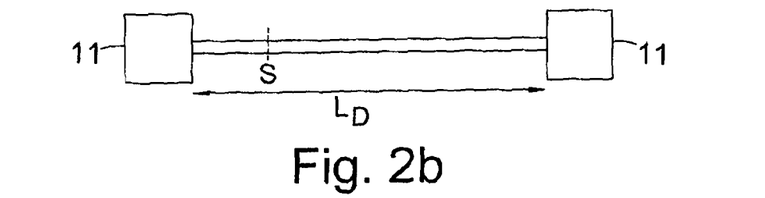

FIG. 2(b) shows an arrangement in which a light assembly 11 is provided at each end of the fiber light rope 20. In this case, bi-directional injection of modulated light carrying communications is possible. In addition, the system 11 can provide lighting and communications along the entire length $L_D$ of the fiber light rope 20 even if the fiber light rope 20 is severed S at any point along its length, as the portions of the fiber light 20 on either side of the severed point S can be illuminated by one or the other of the two light assemblies 11.

It will be appreciated that bi-directional injection of light into the fiber light rope is advantageous in providing more uniform emission of light along the length of the fiber light rope than is the case with unidirectional injection at just one end of the fiber.

Figure 2C:
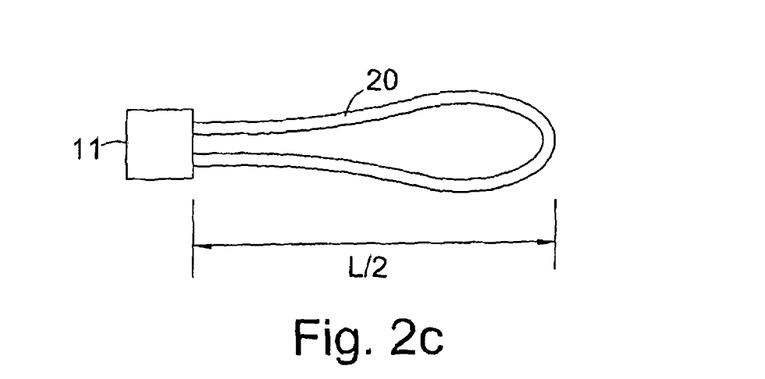

FIG. 2(c) shows an arrangement in which a single light assembly 11 is provided and the light beam is split using, for example, a beamsplitter (not shown), to double inject light into opposing ends of a single length of fiber light rope 20. In this case, the light source and the rope combine to form a closed optical loop. This arrangement ensures light and communications can be provided along the entire length of the fiber light rope 3 irrespective of where the rope has been severed.

Figure 2D:
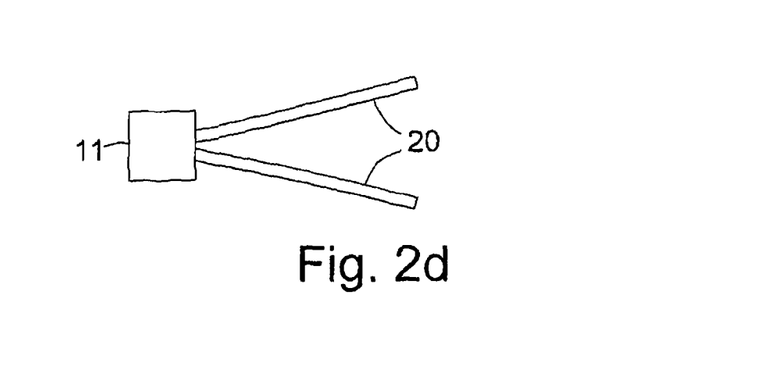

In FIG. 2(d), the light beam is split using a beamsplitter to double inject into two separate lengths of fiber light rope 20. This arrangement provides more than one fiber light rope 20 per light assembly 11 and thus both flexibility in the location of the assembly 11 (the fiber light ropes can go in opposite directions) or the ability to light both sides of a passageway.

Figure 3:
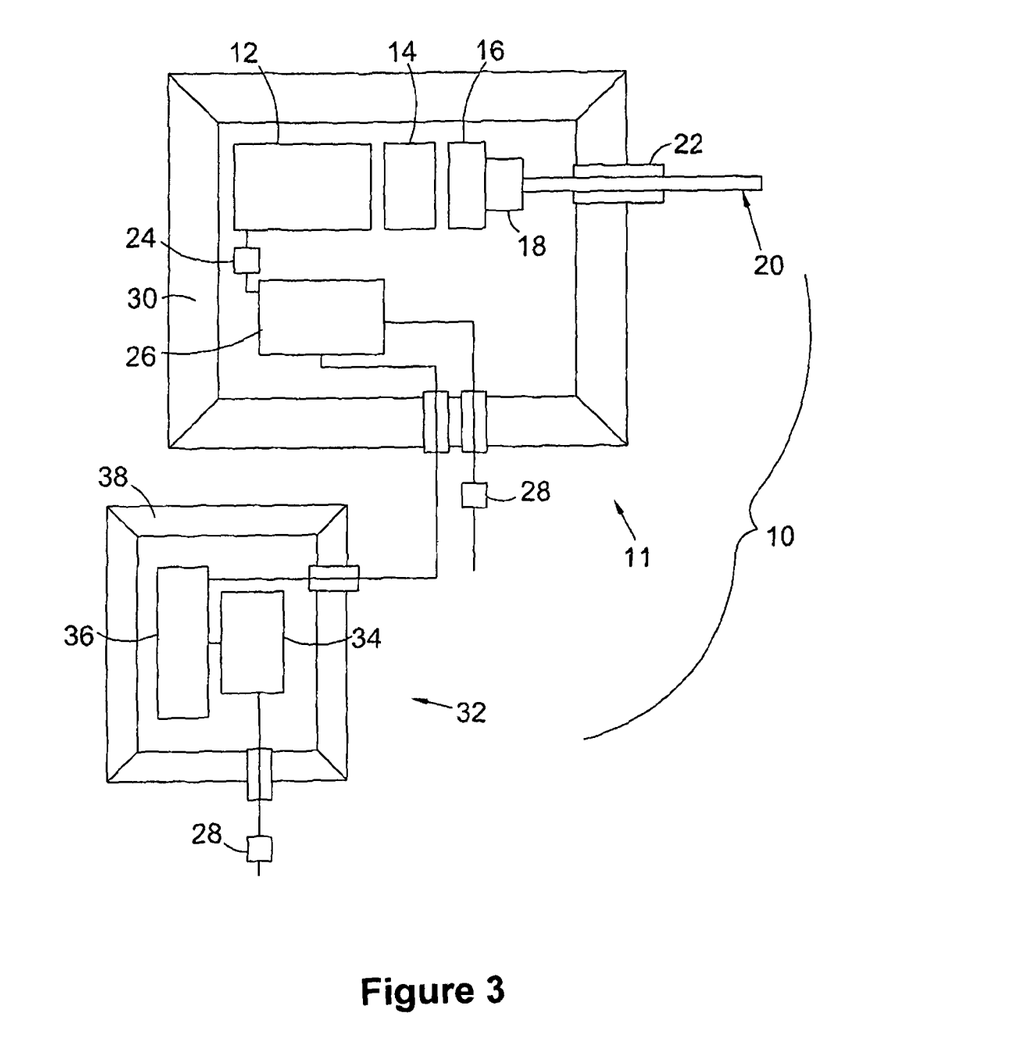
FIG. 3 is a schematic diagram of a dual function lighting and communication system for use in a potentially dangerous environment.

FIG. 3 shows another example of a light rope lighting and communication system. This has a light assembly 11, a fiber light rope 20, and a battery back up (BBU) unit 32. The laser light assembly 11 has a DPSS laser 12 (output wavelength of 532 nm), which provides a beam of light (although a light-emitting-diode (LED) or any other suitable source could be used). On the optical path of the beam are coupling optics 14, an index matching gel cell 18, and the fiber light rope 20. Further included in the light assembly 11 are a current protection module 24 and a management unit (LMU) 26. All the elements of the light assembly 11 are housed in an explosion and flameproof box 30.

The coupling optics 14 shape the beam and launch it into the fiber light rope 20 to ensure full fill therein and a substantially uniform power distribution so as to prevent the beam from concentrating on a small area of the fiber light rope 20 and producing areas of higher temperature. The coupling optics 14 may be, for example, telescope coupling optics, although any suitable optical arrangement may be used. The fiber light rope 20 is held in place by a fiber clamp 16. The fiber light rope 20 is constructed of 14 individual fibers held in a clear outer sheath. The fiber light rope 20 exits the explosion and flameproof box 30 by means of a flameproof gland 22.

The LMU 26 controls the electrical power supplied to the DPSS laser 12 for generating the light beam. Each laser has a characteristic drive current-output optical power relationship. By varying or modulating this, the LMU 26 can modulate data carrying messages onto the light injected into the rope. In use, the DPSS laser 12 is activated and controlled by the LMU 26 to output a beam of laser light into the fiber light rope 20.

Light is emitted from all sides of the fiber light rope 20 and as such the intensity of the laser beam within the fiber light rope 20 is highest closest to the laser light assembly 11. Even though the brightness of the light is far higher at the start of the fiber light rope 20 than at points further along it, this brightness difference is not noticeable to the naked eye because the human eye responds in a logarithmic fashion to light.

Consequently, the rope remains an effective source of illumination along its length. Equally, the brightness remains of a sufficiently high level to be detectable by communication modules carried by personnel, so that any messages, for example relating to an emergency situation can still be transmitted, even in potentially very dangerous situations. However, it will be appreciated that bi-directional injection of light into the fiber light rope is advantageous in providing more uniform emission of light along the length of the fiber light rope than is the case with unidirectional injection at just one end of the fiber.

In some circumstances, it may be useful to allow return messages or signals to be sent from personnel or devices/systems located within the vicinity of the rope. To this end, the detector unit may be modified so as to include a source of optical radiation with facilities for the modulation of such radiation so as to carry communications, and incorporating a free space to fiber coupler or a fiber to fiber coupler, for the purpose of injecting the modulated optical radiation into the fiber light rope when the detector unit is brought into contact or close proximity with the fiber light rope, for example as described below.

Using the systems of the invention, messages/communications can be sent to personnel or control signals/information can be sent to devices/systems located within the vicinity of and throughout the length of the light rope. In some cases, return signals may be sent along the rope from personnel or devices/systems located in the rope's vicinity.

The light rope communication system of the present invention can be arranged to allow continuous spatial access (CSA) to the transmitted message/communication data along the entire length of the fiber, combined with localized signal capture (LSC). The former feature avoids blocking effects normally associated with line of sight optical systems, whereas the latter feature avoids multipath fading effects and hence the bandwidth limitations associated with non-directed geometries; limiting effects recognised within the present state of the art.

Figure 4A:
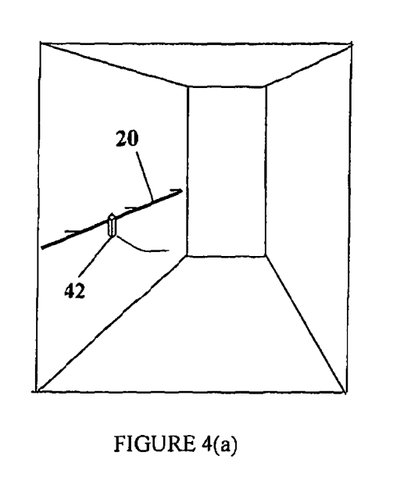
FIG. 4(a) is a schematic diagram showing a fiber light rope deployment suitable for localized signal capture within a continuous spatial access scheme.

FIG. 4(a) shows the topology of a continuous spatial access system combined with local signal capture. The side-emitting fiber light rope 20 is located in a manner so as to be accessible to personnel along its entire length (or as much of its entire length as is deemed practicable or necessary). The communication link is established by the user attaching an optical detector module 42 onto the rope, as shown in FIG. 4(c). The detector module 42 is designed to capture the optical radiation (light) side-emitted by a short length of the fiber at the location of the user, and to efficiently transfer this light so captured onto an optical detector contained within the optical detector module 42. The detector converts the modulation associated with the optical signal into modulation of the generated photocurrent, the latter then being processed by standard techniques to allow recovery and processing of the transmitted data.

Figure 4B:
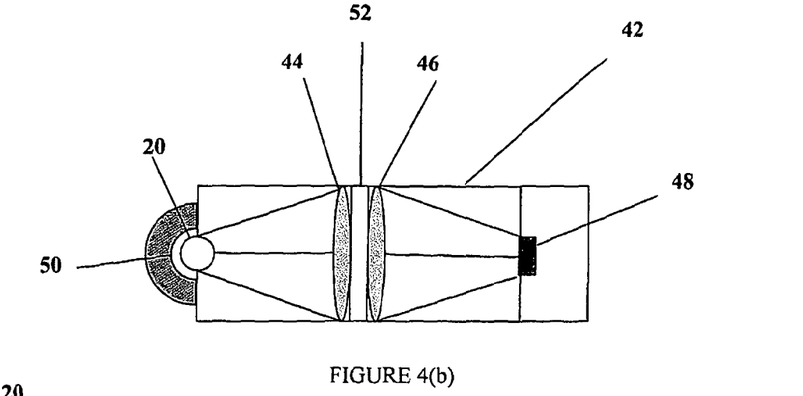
FIG. 4(b) is a schematic showing a typical optical layout for a detector for use in the system of FIG. 4(a)
Figure 4C:
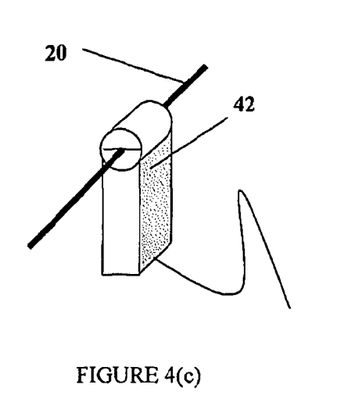

FIG. 4(b) shows an example of the optical detector module 42 in more detail. This has a rope cradle adapted to be a snug fit around the fiber light rope. The cradle has two parts, an upper movable part or lid and a lower part connected to a housing containing detector optics. The upper and lower parts have matching semi-cylindrical channels sized and shaped to accommodate and retain the fiber light rope when the two parts are positioned together over the light rope. The upper part is movable between an open position and a closed position. In the open position, the rope can be located in the semi-cylindrical channel in the lower part. In the closed position, the upper part can be moved into contact with the lower part, so the rope is wholly enclosed around its perimeter. An inner curved surface 50 of the upper part is reflective so that light emitted from the rope is reflected towards the detector optics. The detector optics comprise a collimator lens 44 and a focusing lens 46, which act to collimate and focus light from the emitting area of the rope onto a detector 48, thereby allowing the light to be imaged.

In a specific example, the detector module 42 is designed to capture the side emitted radiation along a 5 mm length of the fiber, this length being chosen as comparable to the fiber rope 20 diameter so that radiation is collected from an effective square emitting area of 5×5 mm². The lens 44 may be a 2 cm diameter by 2 cm focal length lens 44 for collimation. A similar lens is used for focusing. Using these components and dimensions, the emitting area can be imaged so as to fill a 5×5 mm² optical detector 48.

In a typical example, the side emitting optical fiber light rope 20 of length 75*m* is illuminated with optical radiation from light emitting diodes (LEDs) such that the input power into the fiber rope is 150 mW (a conservative estimate since typical coupling efficiencies demonstrated with state of the art LEDs into such fiber light ropes are of the order of 30%, so an LED producing a primary power of 500 mW is required, well within the current state of the art with regard to such sources). On the basis of a uniform loss of optical radiation by side emission along the length of the fiber such that over the length of the fiber all the input radiation is lost in this way, then the average power loss per unit length is 2 µW/mm.

For the case of the f-1 optics scheme shown in FIG. 4(*b*) the collection efficiency is around 12% resulting in ~1 µW of optical radiation being incident on the detector. Assuming a detector responsivity of 0.6 AW$^{-1}$; a background photocurrent density of $10^{-4}$ A cm$^{-2}$; a boot-strapped impedance amplifier matched to the above detector; a detector capacitance that scales with detector area, and as such is of the order of 50 pF in the present case, then within the present state of the art, as it relates to optical wireless systems, Street et al. teach that in order to attain a data rate of 100 Mb/s with a bit error probability of $10^{-9}$, then a power flux density (PFD) for the optical radiation of −32 dBm cm$^{-2}$ is required. In the present case, where the area of the detector 48 is 25 mm², this implies a required optical power of <0.2 µW, which is significantly less than the optical power available by collection from a 5 mm length of the side emitting fiber.

For the purposes of frequency multiplexing optical bandpass filters 52 may be inserted between the two lenses 44 and 46 in the region where the collected radiation is collimated, so that different communication channels can be assigned different optical wavelengths. It will be appreciated that within the present state of the art bandpass filters with bandwidths ~10 nm are available for the visible/near-infrared spectral range (500-1500 nm) implying that 100 separate communications channels can thereby be accessed within a single fiber light rope, hence implying a total bandwidth capability for embodiment 1 of 10 Gb/s.

The geometry described with reference to FIG. 4 avoids multipath fading effects due to the highly limited range of path lengths associated with the collection of the optical radiation. The range in path length is ~5 mm, implying that the bandwidth limitation imposed by multipaths is of the order of 60 Gb/s in the present case. This bandwidth limit will be more closely approached, compared to the present analysis, as LEDs develop further with regard to increasing optical power and increasing brightness. Frequency multiplexing using bandpass filters as described above is capable of providing some one hundred separate communication channels in the visible/near-infrared spectral ranges.

If optical power for the purpose of communications is injected in both ends of the fiber so as to produce a more even intensity distribution associated with the side-emission along the length of the fiber, as is highly desirable, then at any point along the fiber the side emission is the summation of these two contributions, hence constituting a two-path geometry. The path length difference between the two paths will vary with location along the fiber-rope, with the potential to compromise the bandwidth. With such a simple geometry where only two pathways are involved, compensation may be applied through suitable electronic processing so as not to compromise the bandwidth as stated in the previous paragraph.

The system of FIG. 4 requires the detector to be in close proximity to the light rope. However, the light rope communication system of the present invention also can be arranged as a diffuse system providing an accessible communications link along the entire length of the fiber rope without the requirement of attaching the receiver to the rope. This allows uninterrupted communications with ambulatory or otherwise mobile persons moving within a defined distance from the rope, and while moving along the entire length of the rope. FIG. 5 shows an example of a diffuse communications system. This has a side-emitting fiber light rope 20 and a detector 48 adapted to detect light from the rope anywhere within a defined range, for example 3-5 m.

Figure 5A:
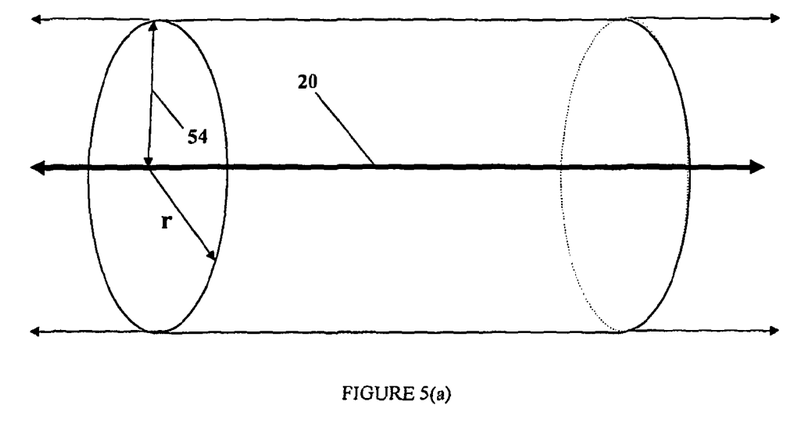

In contrast to point or quasi-point sources, well known within the present state of the art, a fiber light rope is a source of optical radiation that has a linear spatial geometry, effectively of infinite length. This means that the power flux density (PFD) of the optical radiation emitted from the fiber rope falls of linearly with radial distance from the rope, as opposed to quadratically (inverse square law) with distance as is the case with a point source. This has the advantage that the power flux density (PFD) of the optical radiation falls off more slowly with distance from the source in the case of the fiber light rope compared to the case of the point source. This is illustrated in FIG. 5(*a*), for which geometry it may be shown that the power flux density (PFD), I, of the optical radiation at a radial distance, r, from fiber rope is given by:

$$I = \frac{\alpha}{2\pi r},$$

where α is the optical power emitted per unit length of the rope.

Consider a side-emitting fiber-rope of length 75*m* illuminated from both ends with LEDs such that the optical input power at each end is 500 mW. On this basis the power emitted per unit length of the fiber is 130 µW/cm. Also consider a person located within a range (radial distance) of 3 m from the fiber, and at any position along the 75 m length of the fiber, thereby corresponding to an accessible volume of ~2000 m³. Using the above expression the power flux density (PFD) of the optical radiation at the person is ~70 nW/cm². For a planar optical detector 48 circular in shape and of radius 1 cm, the optical power received is ~210 nW.

To assess whether the signal in the system of FIG. 5 is of a practical, usable level, consider a detector responsivity of 0.6 $AW^{-1}$; a background photocurrent density of $10^{-4}$ A $cm^{-2}$; a boot-strapped impedance amplifier matched to the above detector; a detector capacitance that scales with detector area, and as such is of the order of 600 pF in the present case. The present state of the art as it relates to optical wireless systems, Street et al (see Reference A. M. Street et al) teach that in order to attain a data rate of 10 Mb/s with a bit error probability of $10^{-9}$, then a power flux density (PFD) for the optical radiation of −43 dBm $cm^{-2}$ is required. In the present case, where the area of the detector is 3 $cm^2$, this implies a required optical power of <150 nW, a value consistent with that available at the detector from the side emitting fiber at radial distances up to 3 m, as calculated previously.

The geometry described with reference to FIG. 5 is based on double ended injection. This introduces pronounced multipath (in this case predominantly two-path) fading effects due to injection of the optical carrier radiation into both ends of the fiber, and the subsequent changes in the relative lengths of these two paths, as measured from the ends of the fiber to the point of detection, with progression along the fiber length. Compensation occurs in the middle of the fiber. The extremes of path difference occur at each end of the fiber, where an optical path difference ~100 m is encountered, corresponding to a time delay of 0.3 μs, implying a bandwidth limitation of 3 Mb/s. Such a limitation can be avoided by single ended injection of the optical radiation into the fiber. However, it is generally desirable to retain double ended injection in order to provide more uniform side emission, and in this case measurement of the relative time delay between the two paths through suitable electronic processing can be used to correct for the two-path effect and thereby avoid compromising the bandwidth. Further, if desired the effect could be exploited to provide the user with a means for self-location along the fiber length through the above knowledge of the relative time delay encountered at the location point of the user. Given the proposed geometry, the maximum differences in multiple-path lengths due to multiple reflections/scattering from surrounding surfaces are then likely to be of the order of the maximum working distance from the fiber, this being, in the present example, of the order of 3 m. The associated bandwidth limitation is hence of the order of 100 Mb/s.

Figures 5B, 5C:
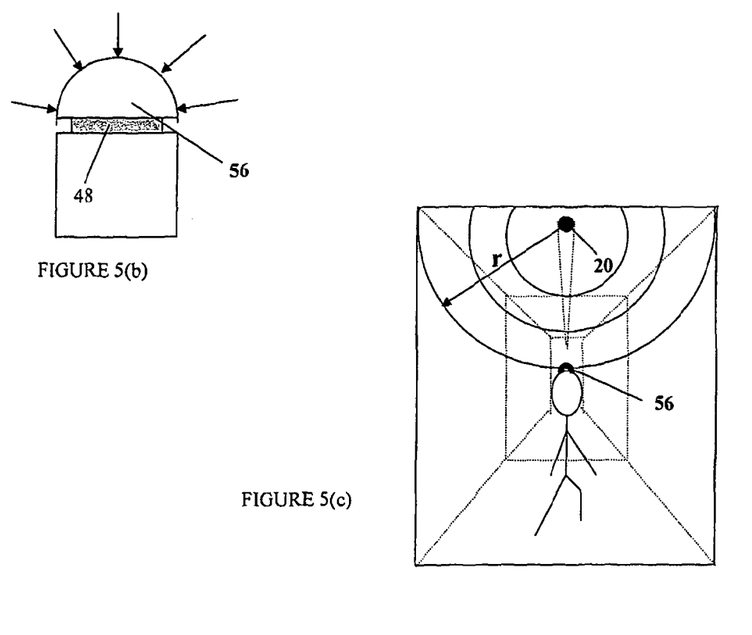

Numerous methods are known for improving the performance of optical detectors 48 for use in diffuse geometries. FIG. 5(*b*) shows an example. This has a hemispherical lens, which is used as a non-imaging concentrator 56 located on the planar detector 48, as shown in FIG. 5 (*b*). This has a wide field of view (π/2), and omnidirectional gain of the order of $n^2$, where n is the internal refractive index. A wide field of view allows effective use of the detector while relaxing the need to point the detector in the direction of the source. FIG. 5 (*c*) shows in cross-section the deployment of such a non-imaging concentrator 56 where the hemispherical lens receives optical radiation from the fiber light rope located above the person, the linear extension of which results in the power flux density falling off inversely with distance r.

A skilled person will appreciate that variations of the disclosed arrangements are possible without departing from the invention. For example although the detector units 8 are described as having a user interface, for example a screen, for presenting the message, where the message is intended merely for use by other equipment or devices, no screen or display would be necessary. Accordingly the above description of specific embodiments is made by way of example only and not for the purposes of limitation. It will be clear to the skilled person that minor modifications may be made without significant changes to the operation described.

The invention claimed is:

1. A communications system comprising:
   at least one light source;
   a side-emitting fiber light rope into which light emitted from the light source is coupled; and
   a means for sending at least one communication data carrying optical signal comprising communications data along the fiber light rope, wherein the at least one light source and the side-emitting fiber light rope are arranged to provide data communication and a source of illumination along the length of the fiber light rope.

2. A system as claimed in claim 1 wherein the means for sending at least one data carrying optical signal along the fiber light rope are operable to modulate the light from the light source that is used for the source of illumination, the modulation representing the data-carrying signal.

3. A system as claimed in claim 1 wherein two sources are provided, one for illumination and one for generating the data-carrying signal.

4. A system as claimed in claim 1 wherein the light source is at least one of a laser, a laser diode, or an LED.

5. A system as claimed in claim 1 wherein the light coupled into the fiber is green or near green.

6. A system as claimed in claim 1 further comprising a topology that allows continuous spatial access to the transmitted communications along the entire length of the fiber light rope combined with localized signal capture for the avoidance of multipath and related interference effects.

7. A system as claimed in claim 1 which is a diffuse system providing accessible communications along the entire length of the fiber light rope without the requirement for attaching the receiver to the fiber light rope so allowing ambulatory or other mobile access.

8. A system as claimed in claim 7 wherein the intensity or power flux density of the optical radiation propagating in free space and carrying the communications varies inversely with the orthogonal distance from the fiber light rope, as opposed to inversely as the square or some other integer or non-integer power of the distance from the fiber light rope.

9. A system as claimed in claim 1, wherein the light coupled into the fiber light rope substantially fills the fiber light rope.

10. A system as claimed in claim 1, wherein the light coupled into the fiber light rope has a substantially uniform power or intensity distribution.

11. A system as claimed in claim 1 further comprising means for shaping the light so that it substantially fills the fiber light rope and has a substantially uniform power or intensity distribution.

12. A system as claimed in claim 1 further comprising coupling optics to couple the light into the fiber light rope.

13. A system as claimed in claim 12 wherein the coupling optics perform the dual function of coupling the light into the fiber and shaping the light, so that it substantially fills the fiber light rope and has a substantially uniform power distribution.

14. A system as claimed in claim 12, wherein the coupling optics are telescope coupling optics.

15. A system as claimed in claim 12, wherein the coupling optics include beam transformer optics to shape the light into a beam having a predetermined profile to promote spreading of the beam in the fiber light rope.

16. A system as claimed in claim 1 further comprising a receiver for receiving light emitted from the fiber light rope and a processor for processing the received light to determine any data carrying message or signal.

17. A system as claimed in claim 16 wherein the processor is operable to decode or demodulate the received signal thereby to determine the data-carrying message.

18. A system as claimed in claim 16 wherein the receiver comprises at least one user interface for presenting the data-carrying message or signal to a user.

19. A system as claimed in claim 18 wherein the at least one user interface comprises a display.

20. A system as claimed in claim 1, wherein the fiber light rope comprises a single solid fiber or a multi-core fiber or a bundle of single fibers.

21. A system as claimed in claim 20, wherein the fiber light rope comprises a plurality of side emitting fiber optic cables.

22. A system as claimed in claim 20 wherein the fiber light rope comprise a plurality of side emitting single fibers that are woven together or braided together for the purpose of maintaining the overall integrity of the fiber light rope.

23. A system as claimed in claim 1 further comprising a beamsplitter in the optical path of light emitted by the optical source to split the light into two or more beams.

24. A system as claimed in claim 23 wherein the two or more beams are coupled into two or more fiber light ropes.

25. A system as claimed in claim 23 wherein the two or more beams are coupled into opposite ends of a single fiber light rope to form a closed loop.

26. A system as claimed in claim 1, wherein the fiber is made from one of the following materials: acrylic, PMMA, silica.

27. A system as claimed in claim 1 wherein facilities are provided to inject into the fiber light rope optical radiation for the purpose of sending a return communication thereby making the communications system implement a receive and return communications system as opposed to a receive only communications system.

28. A system as in claim 27 wherein coupling of the return communications into the fiber light rope is by means of free-space to fiber and fiber to fiber couplers.

29. A system as claimed in claim 1 comprising a detector for detecting the data carrying signal.

30. A system as claimed in claim 29 wherein the detector is adapted to detect the data carrying signal in close proximity to the fiber light rope.

31. A system as claimed in claim 29, wherein the detector is adapted to fit on or around the fiber light rope.

32. A system as claimed in claim 31 wherein the detector is adapted to fit wholly round the periphery of the fiber light rope.

33. A system as claimed in claim 1 wherein the detector is adapted to detect the data carrying signal remotely from the fiber light rope.

34. A system as claimed in claim 33 wherein the detector is adapted to detect the data carrying signal within a range of more than 1m from the fiber light rope, for example more than 2m from the rope.

35. A detector for use in a communication system wherein the detector comprises:
at least one optical receiver for receiving communication data carrying signals comprising communications data from a side-emitted fiber light rope which emits light from at least one light source, wherein the at least one light source and the side-emitting fiber light rope are arranged to provide data communications and a source of illumination along the length of the fiber light rope; and
at least one decoder for decoding a message within the communication data carrying signal transmitted from the side-emitted fiber light rope, wherein the decoder can decode the message anywhere along a length of the side-emitted fiber light rope.

* * * * *